United States Patent
Ger et al.

(10) Patent No.: US 7,573,984 B2
(45) Date of Patent: Aug. 11, 2009

(54) SYSTEMS AND METHODS FOR PROVIDING EMERGENCY CONTACT SERVICES

(75) Inventors: Shanyu Ger, Naperville, IL (US); Ayat Alihassan, Aurora, CO (US); Frank A. McKiel, Jr., Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 635 days.

(21) Appl. No.: 11/318,635

(22) Filed: Dec. 28, 2005

(65) Prior Publication Data

US 2007/0064882 A1  Mar. 22, 2007

Related U.S. Application Data (60) Provisional application No. 60/714,045, filed on Sep. 2, 2005.

(51) Int. Cl.
*H04M 11/00* (2006.01)

(52) U.S. Cl. ........................................ 379/45; 455/417

(58) Field of Classification Search ............ 379/201.07, 379/213.01, 221.03, 93.24, 88.17–88.25, 379/211.03, 196, 207.03, 207.15, 245, 67.1, 379/70, 37–55; 455/417
See application file for complete search history.

(56) References Cited

U.S. PATENT DOCUMENTS

| | | | | | |
|---|---|---|---|---|---|
| 5,329,578 | A | * | 7/1994 | Brennan et al. | 379/211.03 |
| 5,892,820 | A | * | 4/1999 | Armstrong et al. | 379/213.01 |
| 6,138,008 | A | * | 10/2000 | Dunn et al. | 455/417 |
| 6,879,668 | B2 | * | 4/2005 | Neuwald et al. | 379/93.24 |
| 2004/0223598 | A1 | * | 11/2004 | Spiridellis | 379/201.01 |

\* cited by examiner

*Primary Examiner*—Curtis Kuntz
*Assistant Examiner*—Maria El-Zoobi (57) ABSTRACT

An emergency contact platform provides emergency contact services where usual communications have been disrupted. The emergency contact platform may include a server to receive registration information including a phone number associated with a phone when communication using the phone is impracticable. The server may also be configured to receive an information request identifying the phone number. The emergency contact platform may also include a database to store the received registration information. The server may be also configured to perform a lookup in the database based on the phone number and provide a result of the lookup based on the received information request.

13 Claims, 6 Drawing Sheets

SYSTEMS AND METHODS FOR PROVIDING EMERGENCY CONTACT SERVICES

RELATED APPLICATION

This application claims priority under 35 U.S.C. § 119 based on U.S. Provisional Application No. 60/714,045 filed Sep. 2, 2005, the disclosure of which is incorporated herein by reference.

FIELD OF THE INVENTION

The present invention relates to communications and, more particularly, to communication platforms that may enable communications among parties where usual communications means of have been disrupted.

BACKGROUND

During and following an event, such as an emergency situation, a natural disaster, or a catastrophe affecting parties within a particular geographic area, a need frequently exists for the affected parties to make contact with or be contacted by family members and other interested parties. For example, a hurricane may cause significant flooding, wind damage, and destruction along a coastal area, disrupting communications and other infrastructure, as well as displacing area residents. After such an occurrence, a need may exist to restore communications so that affected parties can locate one another, verify their well-being, assist one another, and the like. It is also important to promptly restore communications so that recovery and relief efforts may be directed to restore living conditions in the affected area.

Even where some communications abilities remain partially or fully intact, communications systems may be overwhelmed with high traffic involving affected parties. If an affected party has been physically displaced (e.g., the affected party's home has been destroyed by a hurricane), then repeated call attempts to a home phone number or random calls to shelters and hospitals trying to locate the displaced party only compound the burden on the communications infrastructure. Aside from the need for affected parties to reach parties not in the affected area (or vice versa), often a need exists for parties within the affected area to contact each other, such as family members who have become separated during a major disaster.

Often, the most critical information that one party seeks about another is simply whether they have survived, their condition, and their location or how they can be reached. A party who is physically displaced or otherwise affected by a catastrophic event may not be reachable at the usual telephone number or via other forms communication which others are accustomed to using to reach the affected party. Even where the affected party eventually reaches an alternative location at which inbound communications may be received, it is difficult for the affected party to inform other parties of the affected party's whereabouts and how the affected party may be reached at the alternative location.

SUMMARY OF THE INVENTION

According to one aspect of the invention, a method of providing communication services is provided. The method may include receiving, by an emergency contact platform, an inquiry from a first party when a second party is unable to receive communications via a telephone number associated with the second party, where the inquiry identifies the telephone number. The method may also include performing a lookup in a database based on the telephone number. The method may also include determining whether contact information associated with the telephone number is stored in the database based on a result of the lookup. In addition, the method may include selectively receiving notification information from the first party when the result indicates that the contact information is not stored in the database.

According to another aspect of the invention, a system including an emergency contact platform is provided. The platform may include a server to receive registration information including a phone number associated with a phone when communication using the phone is impracticable, and to receive an information request identifying the phone number; and a database to store the received registration information, where the server is configured to perform a lookup in the database based on the phone number and provide a result of the lookup based on the received information request.

According to yet another aspect of the invention, a communications platform is provided. The platform may include means for registering a telephone number associated with a registrant, where the registration includes alternate contact information associated with the registrant. The platform may also include means for storing the alternate contact information. The platform may also include means for receiving an inquiry for the alternate contact information from an inquirer, where the inquiry identifies at least one of the registrant or the telephone number. The platform may also include means for retrieving the stored alternate contact information based on the inquiry. The platform may also include means for providing the retrieved alternate contact information to the inquirer. In addition, the platform may include means for enabling communication between the registrant and the inquirer.

BRIEF DESCRIPTION OF THE DRAWINGS

The accompanying drawings, which are incorporated in and constitute a part of this specification, illustrate an implementation consistent with the principles of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Implementations consistent with the principles of the invention provide a communications platform, e.g., an emergency contact platform, for facilitating notifications between parties when an emergency event, e.g., a disaster, has affected the use of a party's normal telecommunications service. When an inquiring party interacts with the emergency contact platform, it may be determined whether a communications identifier, e.g., a phone number associated with the party being sought (the "affected party"), has been registered with the emergency contact platform. In cases where the phone number has been registered, registration information, e.g., contact information for the affected party, may be provided to the inquiring party by the communications platform. In this way, communication may be enabled between the inquiring party and the affected party.

Exemplary System

Figure 1:
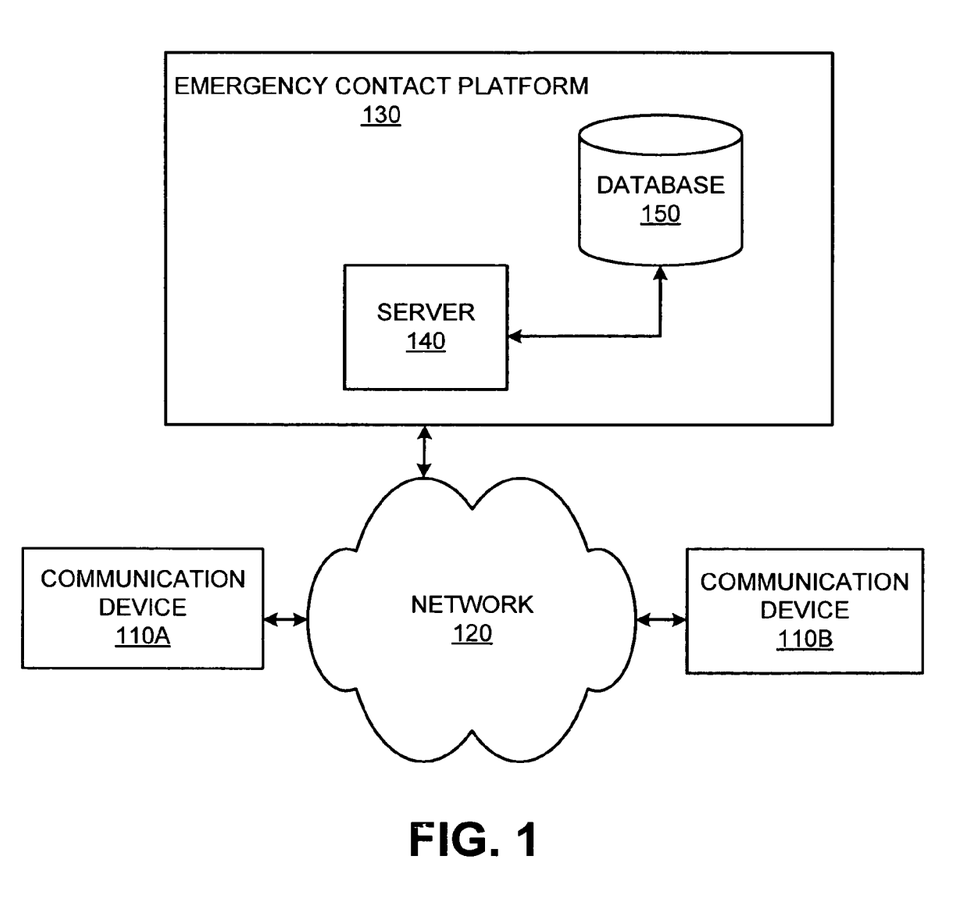
FIG. 1 is a diagram of an exemplary system in which methods and systems consistent with the invention may be implemented.

FIG. 1 is a block diagram of an exemplary system 100 in which methods and systems consistent with the principles of the invention may be implemented. System 100 may include communication devices 110A and 110B (referred collectively as communication devices 110) and an emergency contact platform 130 that connect via a network 120. The exemplary configuration illustrated in FIG. 1 is provided for simplicity. It is to be appreciated that a typical system could include more or fewer communication devices 110, and more emergency contact platforms 130 and networks 120 than illustrated in FIG. 1.

Furthermore, various links shown as connecting the elements may be wired or wireless links or any combination thereof, or any other known or later developed element(s) that is capable of supplying and/or communicating data to and from the connected elements. Additionally, it should be appreciated that while various functional components are illustrated, various other components may also be included. For example, a conference bridge device/platform (not shown) configured to link two or more parties via a conference call and the associated analog and/or digital telephony, circuits, gateways, databases, switching devices, routers, firewalls, software, security components, etc., for supporting the conference call may be included in system 100. These and other devices may enable communications involving at least a first and a second party.

Communication devices 110 may include any device that may interface with a network, such as network 120, to send and receive voice signals. For example, communication devices 110 may include a plain old telephone system (POTS) phone, a cordless telephone, a cellular telephone, or any other type of telephone device. Communication devices 110 may also include, for example, a session initiation protocol (SIP)-based telephone device or another voice over Internet protocol (VoIP)-based telephone device, a personal digital assistant (PDA), or any other multi-function device with telephony capabilities. Communication devices 110 may also include a computer device, a web-based appliance, etc. that may be configured to provide telephone functions.

Network 120 may include a public switched telephone network (PSTN), the Internet, an intranet, a WAN, and/or another type of network that is capable of transmitting voice and/or data signals from a source device to a destination device. Network 120 may further include one or more wireless networks and may include a number of transmission towers, base stations, etc., for receiving wireless signals and forwarding the wireless signals toward the intended destination. System 100 may include other types of networks, such as a private branch exchange (PBX), a LAN, and the like.

Emergency contact platform 130 may include any number of software or hardware-controlled devices or various other components that may be cooperatively configured to provide contact information for affected parties, as described in more detail below. For example, as illustrated in FIG. 1, emergency contact platform 130 may include a server 140 and a database 150. It will be appreciated that emergency contact platform 130 may include other devices, such as an automated call distributor (ACD), a speech synthesizer, a voice response platform or services node, such as an interactive voice response (IVR) unit, a conference bridge device/platform, and the like that may facilitate communications in system 100.

Server 140 may include a computer device that may manage resources of emergency contact platform 130, enable connection to communication devices 110 via network 120, and perform lookups in database 150. Exemplary components of server 140 are illustrated in FIG. 2 and details regarding the specific functionality of server 140 are set forth in additional detail below.

Database 150 may include any storage device capable of storing data that may be supplied and/or accessed by server 140. Server 140 and database 150 are illustrated in FIG. 1 as being connected in emergency contact platform 130. That is, database 150 may be located externally from server 140, as shown. In alternative implementations, the functions performed by server 140 and database 150 may be performed by a single device/platform. Database 150 may include a group of databases that include a number of database fields in any configuration as shown, for example, in FIGS. 3A and 3B. Details regarding the specific functionality of database 150 are set forth in additional detail below.

In an exemplary implementation consistent with the invention, server 140 and database 150 may enable an inquiring party to communicate with an affected party whose registration information is retrievably stored at emergency contact platform 130. In still further implementations, the functions performed by emergency contact platform 130 may be performed by multiple devices/platforms.

Figure 2:
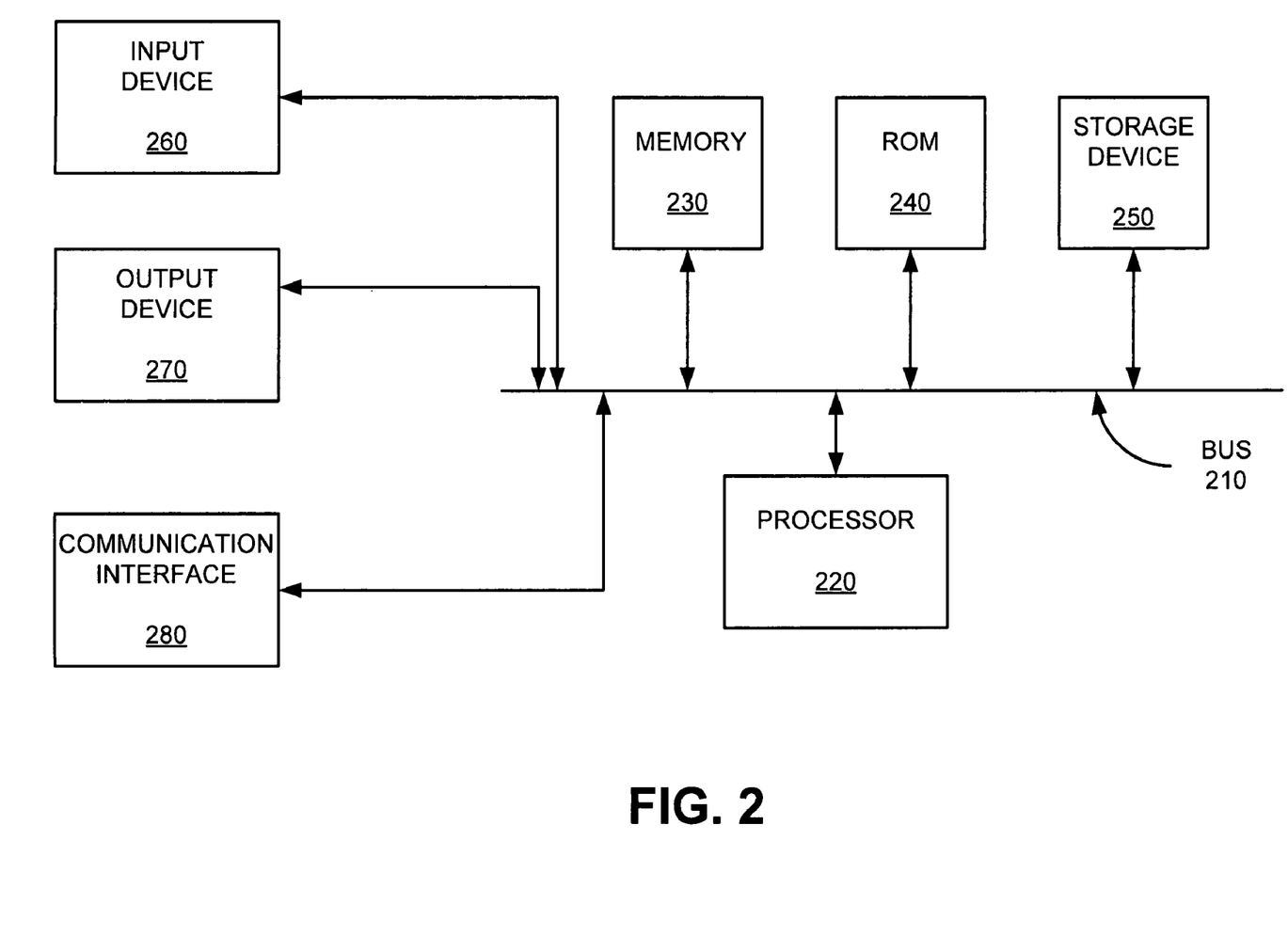
FIG. 2 is an exemplary block diagram of the server of FIG. 1.

FIG. 2 illustrates an exemplary configuration of server 140 in an implementation consistent with the invention. Other configurations may alternatively be used. Server 140 may include a bus 210, a processor 220, a memory 230, a read only memory (ROM) 240, a storage device 250, an input device 260, an output device 270, and a communication interface 280. Bus 210 permits communication among the components of server 140.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more mechanisms that permit an operator to input information to server 140, such as a keyboard, a mouse, a pen, voice recognition, and/or biometric mechanisms, etc. Output device 270 may include one or more mechanisms that output information to the operator, including a display, a printer, one or more speakers, etc.

Communication interface 280 may include any transceiver-like mechanism that enables server 140 to communicate with other devices and/or systems. For example, communication interface 280 may include a modem or an Ethernet interface to a LAN. Alternatively, communication interface 280 may include other mechanisms for communicating via a network, such as network 120.

Server 140, consistent with the invention, provides a platform through which a party using communication device 110A may register information within database 150, and a party using communication device 110B may access the registration information stored in database 150. According to an exemplary implementation, server 140 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 may cause processor 220 to perform acts that will be described hereafter. In alternative embodiments, hard-wired circuitry may be used in place of or in combination with software instructions to implement the present invention. Thus, the present invention is not limited to any specific combination of hardware circuitry/software.

Figure 3A:
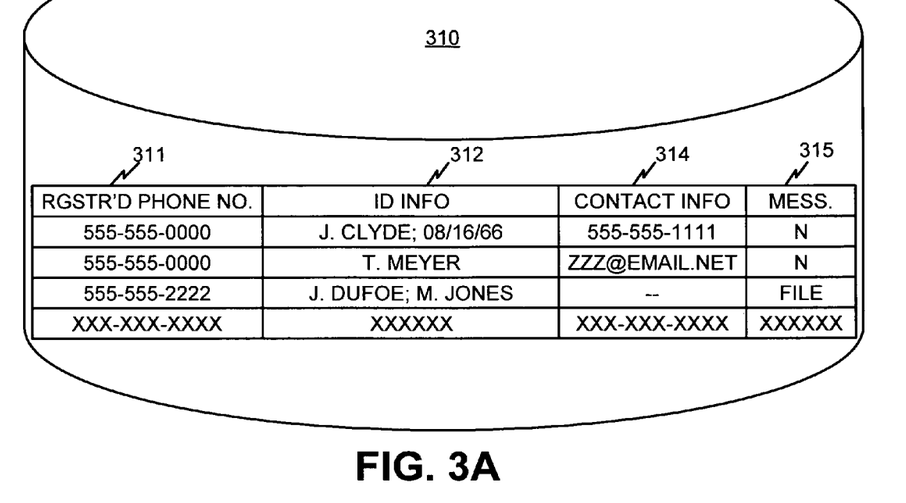
FIGS. 3A and 3B are exemplary diagrams of databases that may be associated with the server of FIG. 1.
Figure 3B:
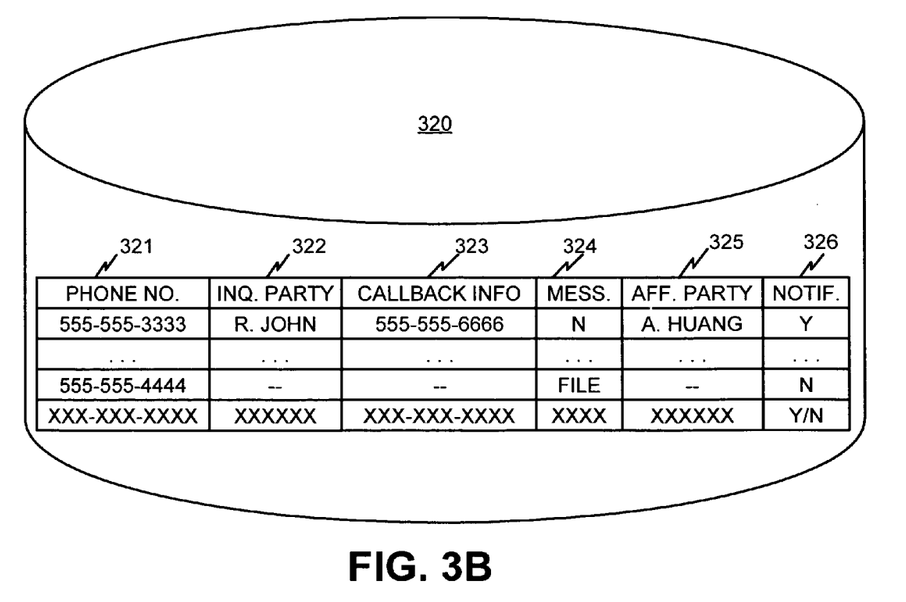

FIGS. 3A and 3B illustrate exemplary databases that may be associated with database 150 in an implementation consistent with the principles of the invention. For example, database 150 may include a registration database 310 and an inquiry database 320. Database 150 may also include other associated databases.

In FIG. 3A, registration database 310, consistent with the principles of the invention, may include registration information stored in the following exemplary fields: a registered phone number field 311, an identification ("ID") information field 312, a contact information field 314, and a message field 315. Other fields may also be included in registration database 310, in a table, or in any other format.

Registered phone number field 311 may store a registered telephone number or other communication identifier associated with an affected party, which may be used to reference the affected party's registration information. ID information field 312 may store the identity of one or more affected parties associated with the registered phone number. For example, ID information field 312 may include personal information, such as a birth date, a maiden name, a home address, a social security number, or some other information identifiable with the affected party, for example, where more than one affected party is registered in association with a particular registered phone number.

Contact information field 314 may store a phone number, an e-mail address, a fax number, an instant messaging ("IM") screen name, a pager number, a physical address, an individual's name, a name of a facility or an organization, and the like, at which the affected party may be contacted. Message field 315 may store a selected pre-generated message or a personalized message from the affected party, such as an audio message. For example, a pre-generated message may include a general message that indicates a status condition and/or a location of the affected party (e.g., "The party you are seeking has been temporarily relocated to the Houston Astrodome."). In one implementation, message field 315 may store a value corresponding to a message that is stored elsewhere in emergency contact platform 130, for example, storage device 250.

In FIG. 3B, inquiry database 320, consistent with the invention, may include inquiry information stored in the following exemplary fields: a phone number field 321, an inquiring party field 322, a callback information field 323, a message field 324, an affected party field 325, and a notification field 326. Other fields may also be included in inquiry database 320, in a table, or in any other format.

Phone number field 321 may store a telephone number or other identification information (e.g., a name) associated with an affected party, which may be received from an inquiring party for referencing a corresponding inquiry. Inquiring party field 322 may store the names of one or more inquiring parties associated with the corresponding inquiry. Callback information field 323 may store a telephone number, an IM screen name, a pager number, a facsimile number, an e-mail address, a physical address, a name of an individual, a name of a facility or an organization, and the like associated with the inquiring party that allows emergency contact platform 130 to contact the inquiring party.

Message field 324 may store a selected pre-generated message or a personalized message from the inquiring party, such as an audio message. In one implementation, message field 324 may store a value corresponding to a message that is stored elsewhere in emergency contact platform 130, for example, storage device 250. Affected party field 325 may store the name of one or more affected parties associated with the phone number of field 321. Notification field 326 may store an indication for notifying the inquiring party in the event of a subsequent registration of the phone number of field 321.

Databases 310 and 320 may be used to facilitate contact between an affected party and an inquiring party respectively performing registration and inquiry operations via emergency contact platform 130. Databases 310 and 320 may also be used to acquire and record data to enable the service provider associated with emergency contact platform 130 to assess a fee for the contact services associated with use of emergency contact platform 130.

Exemplary Processing

Figure 4:
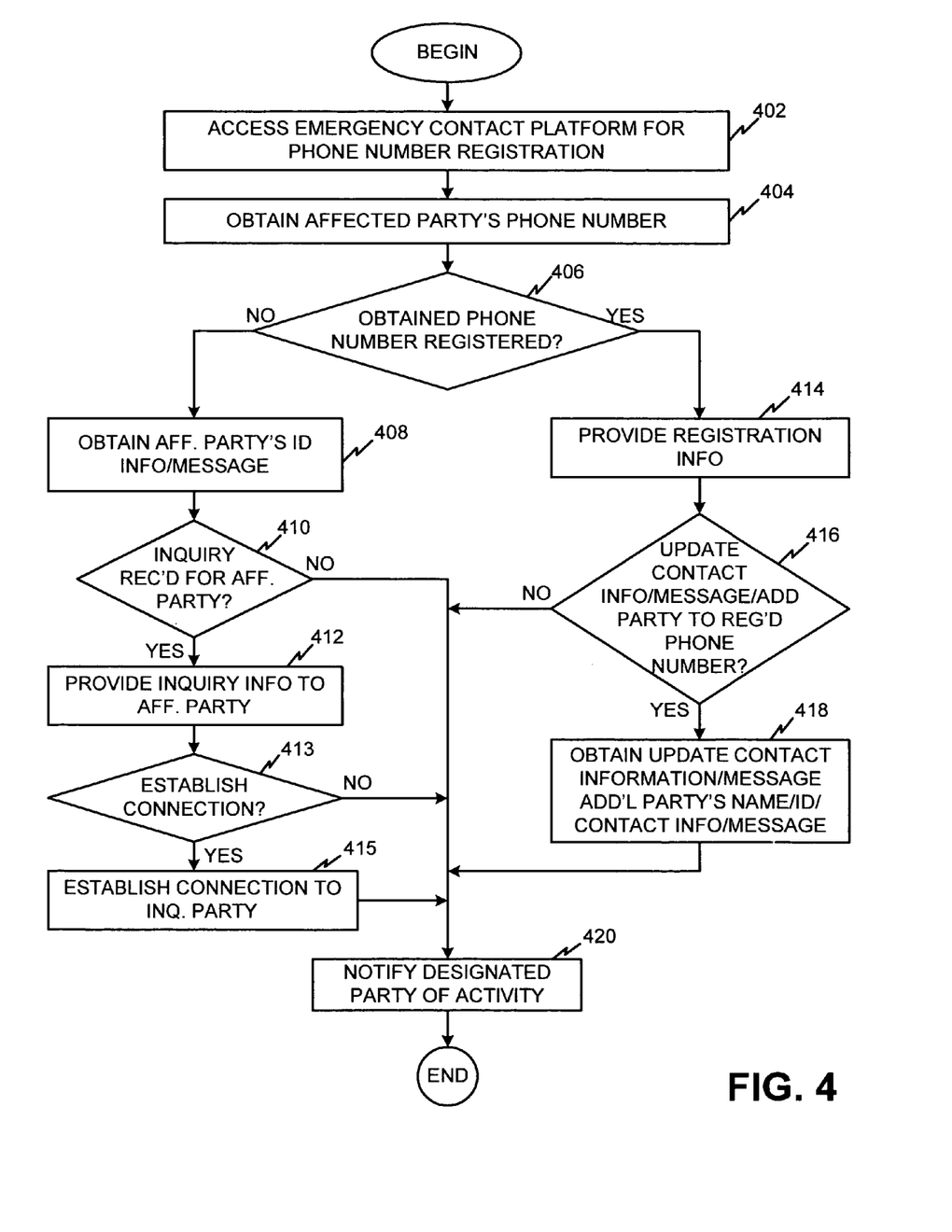
FIG. 4 is a flowchart of an exemplary emergency contact platform registration call flow consistent with the principles of the invention.

FIG. 4 is a flow diagram of an exemplary registration handling process 400, consistent with the principles of the invention, for registering a phone number associated with a party affected by, for example, a natural disaster, which renders the phone number unusable by the affected party. In exemplary registration handling process 400, it is assumed that the affected party is attempting to register a phone number which has not been previously registered with emergency contact platform 130, or to update registration information associated with a phone number which has been previously registered with emergency contact platform 130.

Figure 5:
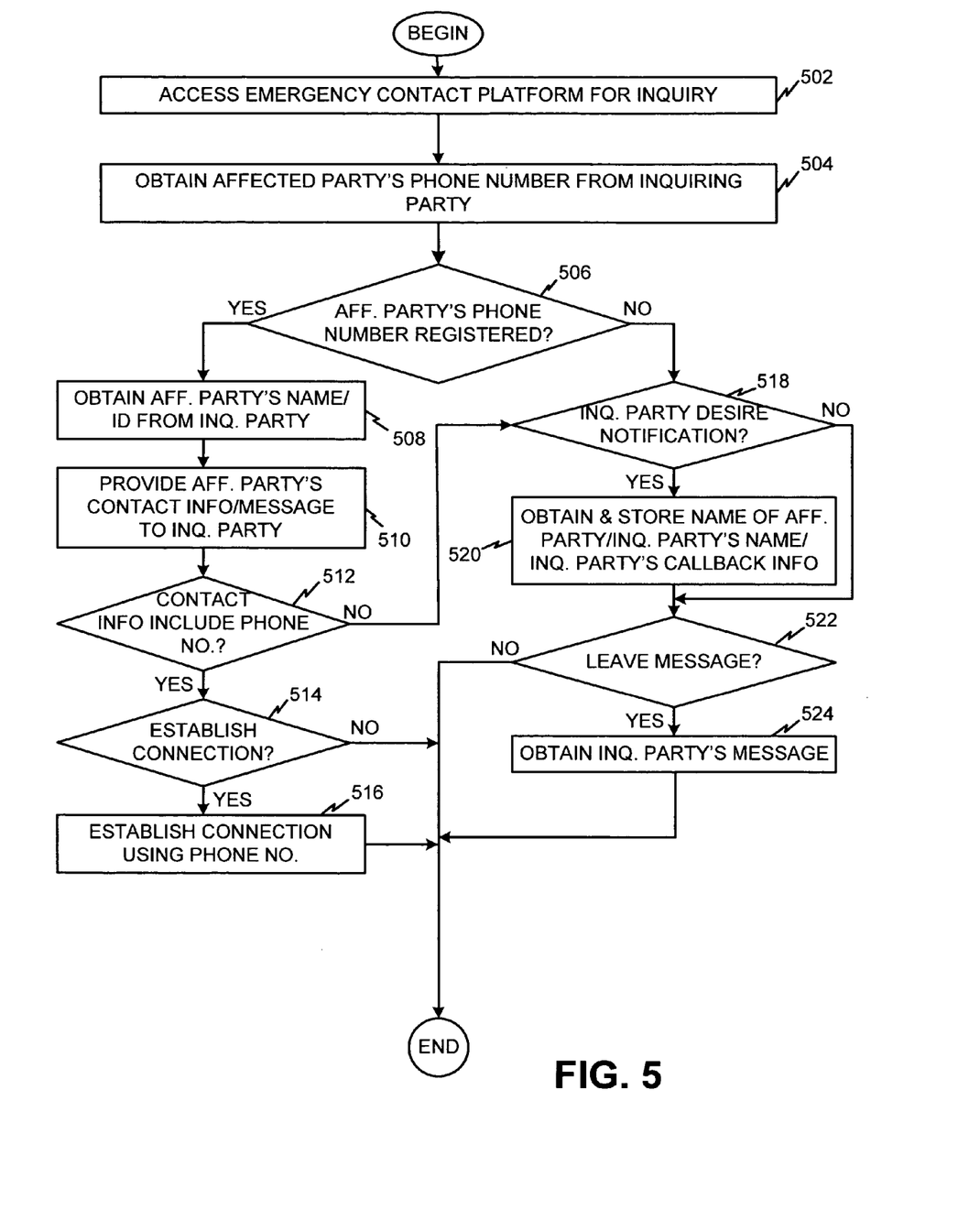
FIG. 5 is a flowchart of an exemplary emergency contact platform inquiry call flow consistent with the principles of the invention.

Exemplary registration handling process 400 may begin with the affected party (or someone else on behalf of the affected party) using communication device 110A, for example, to contact emergency contact platform 130 (act 402). Access to emergency contact platform 130 may be accomplished by any suitable method, for example, via a dedicated phone number, a web address, an e-mail address, an access number associated with a calling card, a toll-free telephone number, call forwarding, operator assistance, etc. Once connected, emergency contact platform 130 may provide a greeting and/or introductory message to the affected party. Any of the interactions between a caller and emergency contact platform 130 as depicted in FIGS. 4 and 5 and elsewhere herein may be accomplished using a fully automatic voice response system, a live operator, or a combination thereof.

In one implementation, once accessed, emergency contact platform 130 may prompt the affected party to provide a communication identifier, e.g., a phone number, for registration (act 404). For example, the prompt may include a script read by a call assistant, an interactive menu provided by an IVR unit, and the like. This prompt or any other may be communicated in any number of languages. In response to the prompt by emergency contact platform 130, the affected party may provide the telephone number, for example, by using a keypad, a voice response, a graphic user interface, etc. Emergency contact platform 130 may receive the provided response, for example, using server 140. In one implementation, emergency contact platform 130 may request the affected party to provide authentication information associated with the received phone number prior to performing further registration acts.

Emergency contact platform 130 may determine whether the received phone number has been previously registered (act 406). In one implementation, server 140 may perform a lookup in database 150 for the received phone number. For example, the received phone number may be compared to the registered phone numbers that are stored in registered phone number field 311 of database 310. When emergency contact platform 130 determines that the received phone number has not been previously registered, emergency contact platform 130 may register (i.e., store) the received telephone number in database 150, for example, in registered phone number field 311 of database 310. Emergency contact platform 130 may record the date and/or time of the registration (or any other interaction with emergency contact platform 130), which emergency contact platform 130 may subsequently provide to an affected party and/or an inquiring party upon the party making a request for same.

Emergency contact platform 130 may obtain, from the affected party, registration information associated with the registered phone number (act 408). This registration information may include or be associated with one or more of the following formats: an audio message (pre-generated or personalized), a textual message, and a string of numbers or responses to prompts from the platform. An arbitrary message, such as a string of numbers, may be stored and exchanged with other callers as a way of communicating, even if the emergency contact platform 130 has no knowledge of the significance of the numbers. In some implementations, text messages may be composed through interaction with the platform, such as by appropriate use of a 'touchtone' keypad by the caller. In one implementation, emergency contact platform 130 may prompt the affected party to provide identity information for association with the registered phone number. In response to the prompt by emergency contact platform 130, the affected party may provide a name or other identification information, as described above, that may be used, for example, to distinguish the affected party from other affected parties that may be associated with the registered phone number. Emergency contact platform 130 may receive the provided response, for example, using server 140. In one implementation, emergency contact platform 130 may store the received name in database 150, for example, in ID information field 312 of database 310.

Emergency contact platform 130 may prompt the affected party to provide contact information for association with the registered phone number. In response to the prompt by emergency contact platform 130, the affected party may provide contact information, as described above, for example, for sending communications to the affected party, and/or providing to an inquiring party. Emergency contact platform 130 may receive the provided response, for example, using server 140. In one implementation, emergency contact platform 130 may store the received contact information in database 150, for example, in contact information field 314 of database 310.

Emergency contact platform 130 may prompt the affected party to provide a message for association with the registered phone number. In response to the prompt by emergency contact platform 130, which may include a menu of pre-generated messages, the affected party may select a pre-generated message or provide a personalized message, such as an audio file that may be provided to an inquiring party. Emergency contact platform 130 may receive the provided response, for example, using server 140. In one implementation, emergency contact platform 130 may store the received message in database 150, for example, in message field 315 of database 310. In one implementation, when an affected party desires to convey information including their whereabouts, and especially in a implementation of emergency contact platform 130 that does not accommodate audio messages, the affected party may interact with an IVR menu to specify their location by using, for example, the alphabet associated with a typical 'touchtone' keypad to find matching names of cities, states, facilities, addresses or other location identifiers.

In one implementation, emergency contact platform 130 may perform bulk registration of a number of received phone numbers and/or affected parties. Emergency contact platform 130 may associate a pre-generated message with each of the registered phone numbers and/or affected parties registered en masse, for example, in lieu of personalized messages and/or individual contact information. For example, registration information for a bulk-registered affected party may include a message indicating that the affected party being sought has been temporarily relocated to a specific location.

Emergency contact platform 130 may determine whether an inquiry has previously been received for the registered phone number (act 410) (i.e., someone seeking the affected party has already inquired about the phone number), as described in more detail below. When emergency contact platform 130 determines that an inquiry has not previously been received for the registered phone number, registration handling process 400 may end, or, alternatively, emergency contact platform 130 may perform other acts, such as act 420, which is described in detail below. Alternatively, when emergency contact platform 130 determines that an inquiry has previously been received for the registered phone number, emergency contact platform 130 may indicate the same and/or provide the inquiry information to the affected party (act 412), including the inquirer's name and/or the date and time of the inquiry.

In one implementation, emergency contact platform 130 may prompt the affected party to indicate whether the affected party desires to be connected to the inquiring party (act 413), where the inquiring party has provided callback information that may be stored, for example, in callback information field 323, as described in more detail below. When emergency contact platform 130 determines that the inquiring party does not desire to be connected and/or that the inquiring party is not able to be connected, registration handling process 400 may end, or, alternatively, emergency contact platform 130 may perform other acts, such as act 420, which is described in detail below. Alternatively, when emergency contact platform 130 determines that the inquiring party does desire to be connected, emergency contact platform 130 may establish the connection using the callback information (act 415). In one implementation, emergency contact platform 130 may make successive attempts to contact the inquiring party by using any of a number of contact alternatives provided by the inquiring party when a previous attempt is unsuccessful.

Returning now to act 406, when emergency contact platform 130 alternatively determines that the received phone number has been previously registered, emergency contact platform 130 may provide to the affected party the registration information that has been previously registered (act 414). The registration information may include or be associated with one or more of the following formats: an audio message (pre-generated or personalized), a textual message, and a string of numbers or responses to prompts from emergency platform 130. In one implementation, emergency contact platform 130 may provide the date and/or time of previous registration and/or provide the message associated with the registration. In another implementation, emergency contact platform 130 may connect the affected party to previously registered affected parties using the corresponding contact information.

Emergency contact platform 130 may determine whether the affected party desires to update any of the registration information or to add an additional affected party associated with the registered phone number (act 416). When emergency contact platform 130 determines that the affected party does not desire to update some or all of the registration information and/or add an additional affected party, registration handling process 400 may end, or, alternatively, emergency contact platform 130 may perform other acts, such as act 420, which is described in detail below. Alternatively, when emergency contact platform 130 determines that the affected party desires to update some or all of the registration information and/or add an additional affected party, emergency contact platform 130 may obtain, from the affected party, updated registration information associated with the registered phone number and/or ID information for the additional affected party (act 418).

In one implementation, emergency contact platform 130 may prompt the affected party to provide updated registration information associated with the registered phone number. In response to the prompt by emergency contact platform 130, the affected party may provide additional or modified ID information, contact information, and/or a message associated with the registered phone number. Emergency contact platform 130 may receive the response, for example, using server 140, and may store the received updated information in the appropriate field of database 310.

In one implementation, emergency contact platform 130 may prompt the affected party to provide ID information for the additional affected party. In response to the prompt by emergency contact platform 130, the affected party may provide a name that may be used, for example, to distinguish the additional affected party from the other affected parties associated with the registered phone number. Emergency contact platform 130 may receive the response, for example, using server 140, and store the received name in database 150, for example, in ID information field 312 of database 310.

At this point, registration handling process 400 may end, or, alternatively, emergency contact platform 130 may perform other acts. In one implementation, for example, emergency contact platform 130 may generate a notification to a designated affected party and/or inquiring party (act 420) who has requested to be notified of any registration activity with emergency contact platform 130 associated with the registered phone number and/or the affected party.

FIG. 5 is a flow diagram of an exemplary inquiring handling process 500, consistent with the principles of the invention, for inquiring regarding a phone number associated with a party affected by, for example, a natural disaster, which renders the phone number unusable to the affected party. In exemplary inquiring handling process 500, it is assumed that the inquiring party is attempting to obtain contact information for an affected party who may or may not have registered with emergency contact platform 130.

Exemplary inquiry handling process 500 may begin with the inquiring party (or someone else on behalf of the inquiring party) using communication device 110B, for example, to contact emergency contact platform 130 (act 502). Access to emergency contact platform 130 may be accomplished by any suitable method, for example, via a dedicated phone number, a web address, an e-mail address, an access number associated with a calling card, a toll-free telephone number, call forwarding, operator assistance, etc.

In one implementation, access to emergency contact platform 130 for inquiries may be accomplished via a toll-free number that differs from the number used to access emergency contact platform 130 for registration. In another implementation, a service provider may automatically forward calls to telephone numbers within an affected area, for example, by designating an area code or telephone exchange for forwarding to emergency contact platform 130. Once connected, emergency contact platform 130 may provide an introductory message to the inquiring party. In one implementation, the introductory message may include general information regarding the relevant emergency event, which may be provided by a responsible government agency or a humanitarian relief organization.

In one implementation, once accessed, emergency contact platform 130 may prompt the inquiring party to provide a phone number or other ID information for the affected party for performing the inquiry (act 504). For example, the prompt may include a script read by a call assistant, an interactive menu provided by an IVR unit, and the like. This prompt or any other may be communicated in any number of languages.

In response to the prompt by emergency contact platform 130, the inquiring party may provide the telephone number, for example, by using a keypad, a voice response, a graphic user interface, etc. Emergency contact platform 130 may receive the response, for example, using server 140. Emergency contact platform 130 may record the date and/or time of the inquiry (or any other interaction with emergency contact platform 130), which emergency contact platform 130 may subsequently provide to an affected party (or an inquiring party).

Emergency contact platform 130 may determine whether the received phone number has been previously registered (act 506). In one implementation, server 140 may perform a lookup in database 150 for the received phone number. For example, the received phone number may be compared to the registered phone numbers that are stored in registered phone number field 311 of database 310.

When emergency contact platform 130 determines that the received phone number has been previously registered, emergency contact platform 130 may prompt the inquiring party to provide ID information for the affected party where more than one party is associated with the registered phone number (act 508). In response to the prompt by emergency contact platform 130, the inquiring party may provide a name that may be used, for example, to distinguish the affected party from the other registered affected parties associated with the received phone number. Emergency contact platform 130 may receive the response, for example, using server 140.

Emergency contact platform 130 may retrieve some or all of the registration information associated with the registered phone number based on the received name of the affected party. In one implementation, server 140 may perform a lookup in database 310 for the registration information associated with the received phone number. For example, server 140 may retrieve the contact information stored in contact information field 314 and/or the message stored in message field 315 of database 310. Emergency contact platform 130 may provide some or all of the retrieved registration information to the inquiring party, for example, via server 140 (act 510), including date and time of last contact with the affected party.

Emergency contact platform 130 may determine whether the retrieved contact information includes a contact telephone number (act 512). When emergency contact platform 130 determines that the retrieved contact information does not include a contact telephone number, inquiry handling process 500 may proceed to act 518, which is described in detail below. When emergency contact platform 130 determines that the retrieved contact information does include a contact telephone number, emergency contact platform 130 may determine whether the inquiring party desires to be connected to the telephone number (act 514).

When emergency contact platform 130 determines that the inquiring party does not desire to be connected to the contact telephone number, inquiry handling process 500 may end. When emergency contact platform 130 determines that the inquiring party does desire to be connected to the contact telephone number, emergency contact platform 130 may establish a connection using the contact telephone number (act 516). In one implementation, the connection may be established via server 140.

In one implementation, emergency contact platform 130 may restrict the duration of the connection to a predetermined amount of time. In yet another implementation, a release link trunking (RLT) process may be used to accomplish the connection. Once the connection is established and/or terminated, inquiry handling process 500 may end, or, alternatively, include additional acts.

In one implementation, emergency contact platform 130 may determine that connectivity to the contact telephone number is not available, for example, due to call volume, current use, etc. For example, emergency contact platform 130 may attempt to call the contact telephone number and discover that the trunk is full or receive a "busy" signal. When emergency contact platform 130 determines that the desired connection cannot be established, emergency contact platform 130 may inform the inquiring party that the line is busy, circuits are full, etc.

In one implementation, emergency contact platform 130 may determine whether the inquiring party is available to be contacted, using a presence indicator associated with the inquiring party. For example, a presence indicator that is associated with the inquiring party as described in the Internet Engineering Task Force (IETF) document, RFC 2778, may be used. In one implementation, emergency contact platform 130 may make successive attempts to contact the inquiring party by using any of a number of contact alternatives provided by the inquiring party when a previous attempt is unsuccessful.

Returning now to act 506, when emergency contact platform 130 determines that the received phone number has been not registered, emergency contact platform 130 may store the received phone number in database 150, for example, in phone number field 321 of database 320. In either case where the received phone number has not been registered or the contact information for the registered phone number does not include a contact telephone number (from act 512), emergency contact platform 130 may determine whether the inquiring party desires to be notified when the phone number is subsequently registered or when the contact information associated with the registered phone number is subsequently updated to include a contact telephone number (act 518). When emergency contact platform 130 determines that the inquiring party desires to be notified in either circumstance, emergency contact platform 130 may obtain, from the inquiring party, inquiry information associated with the phone number (act 520).

In one implementation, emergency contact platform 130 may prompt the inquiring party to provide an identity of the inquiring party for association with the phone number. In response to the prompt by emergency contact platform 130, the inquiring party may provide a name or other identification information. Emergency contact platform 130 may receive the provided response, for example, using server 140, and store the received name in database 150, for example, in inquiring party field 322 of database 320. In one implementation, the name of the inquiring party may be automatically obtained from an automatic number identification (ANI) associated with the call placed to emergency contact platform 130.

In one implementation, emergency contact platform 130 may prompt the inquiring party to provide callback information for association with the phone number. In response to the prompt by emergency contact platform 130, the inquiring party may provide callback information, as described above, for example, that may be used to notify the inquiring party when the phone number is subsequently registered or contact information for the already registered phone number is subsequently updated (or the affected party otherwise interacts with emergency platform 130 regarding the registered phone number). Emergency contact platform 130 may receive the provided response, for example, using server 140, and store the received callback information in database 150, for example, in callback information field 323 of database 320.

In one implementation, the callback information may be used to establish a connection to the affected party when the affected party subsequently either registers the received phone number or updates contact information associated with the already registered number (or otherwise interacts with emergency contact platform 130.) That is, the inquiring party may request that they be automatically connected to the affected party by emergency contact platform 130 at a later time when the affected party accesses emergency contact platform 130.

In one implementation, emergency contact platform 130 may prompt the inquiring party to provide an identity of the affected party for association with the phone number. This may be particularly useful when multiple parties may be associated with the same phone number. In response to the prompt by emergency contact platform 130, the inquiring party may provide a name or other identification information that may be used to distinguish the affected party from another affected party that may be subsequently associated with the phone number. Emergency contact platform 130 may receive the provided response, for example, using server 140, and store the received name in database 150, for example, in affected party field 325 of database 320.

In either case where emergency contact platform 130 obtains inquiry information associated with the phone number, as described above, or determines that the inquiring party does not desire to be notified when the phone number subsequently becomes registered, emergency contact platform 130 may determine whether the inquiring party desires that emergency contact platform 130 provide a message to the affected party upon subsequent registration of the phone number or updating of the registered phone number (act 524).

When emergency contact platform 130 determines that the inquiring party does not desire that a message be provided to the affected party upon subsequent registration of the phone number, inquiry handling process 500 may end, or, alternately, emergency contact platform 130 may perform other acts. When emergency contact platform 130 determines that the inquiring party does desire that a message be provided to the affected party upon subsequent registration of the phone number, emergency contact platform 130 may obtain the message from the inquiring party (act 526).

Emergency contact platform 130 may prompt the inquiring party to provide a message for association with the phone number. In response to the prompt by emergency contact platform 130, which may include a menu of pre-generated messages, the inquiring party may select a pre-generated message or provide a personalized message that may be provided to the affected party. Emergency contact platform 130 may receive the provided response, for example, using server 140. In one implementation, emergency contact platform 130 may store the received message in database 150, for example, in message field 324 of database 320. In another implementation, emergency contact platform 130 may time and date stamp the message which emergency contact platform 130 may later provide to an affected party or an inquiring party.

At this point, inquiry handling process 500 may end, or, alternatively, emergency contact platform 130 may perform other acts. In one implementation, for example, emergency contact platform 130 may generate a notification to a designated affected party and/or inquiring party who has requested to be notified of any inquiry activity with emergency contact platform 130 associated with the registered phone number and/or the affected party.

EXAMPLES

Figure 6:
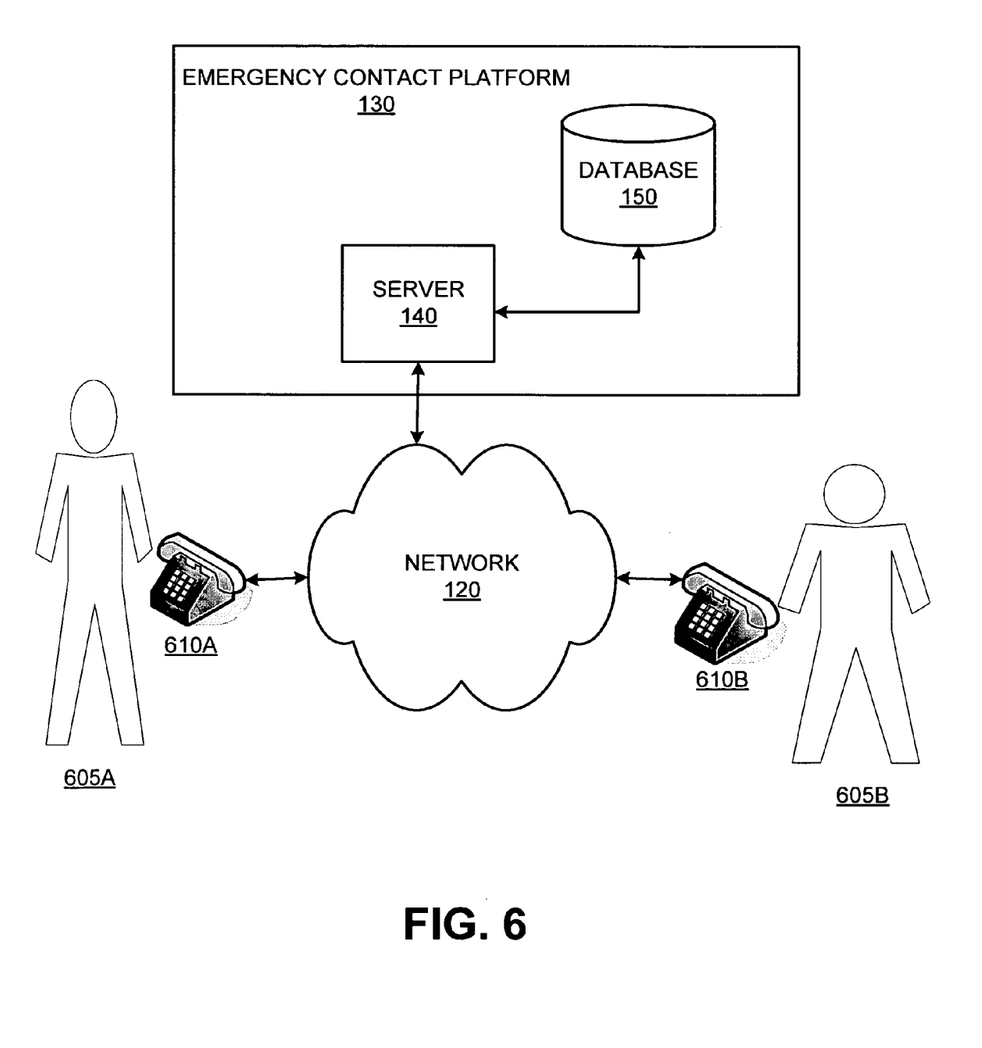
FIG. 6 is an exemplary emergency contact system in which methods and systems consistent with the invention may be implemented.

FIG. 6 illustrates an exemplary emergency contact call flow 600 in which various systems and methods consistent with the principles of the invention may be implemented.

As shown in FIG. 6, inquiring party 605A may use telephone 610A to connect to emergency contact platform 130 via network 120 to inquire about an affected party associated with a telephone number that is unusable due to an emergency event. Inquiring party 605A may call, for example, a toll-free telephone number to access emergency contact platform 130. Upon receiving the call, server 140 may provide an introductory message to inquiring party 605A that provides a status of emergency conditions in select areas relative to the location of the emergency event.

Server 140 may prompt inquiring party 605A to select between phone number registration and inquiring about a phone number. In this example, inquiring party 605A indicates a desire to make an inquiry. Server 140 then prompts inquiring party 605A for the phone number of the affected party. Assume that inquiring party 605A provides the number, 555-555-4444, for example, using a keypad on telephone 610A. In one implementation, inquiring party 605A may have first called the number, 555-555-4444, which was then automatically forwarded to emergency contact platform 130, for example, based on the location of the affected telephone relative to the area affected by the natural disaster, thereby obviating the need to prompt inquiring party 605A for the number to be queried.

Server 140 may perform a lookup in database 150 to determine whether the number, 555-555-4444, is registered. Assume that the number, 555-555-4444, is not registered. Server 140 may prompt inquiring party 605A to indicate whether he desires to be notification in the event that the number, 555-555-4444, becomes registered. Assume that inquiring party 605A indicates a desire to not be notified.

Server 140 may prompt inquiring party 605A to indicate whether he desires to leave a message for the affected party in the event that the number, 555-555-4444, becomes registered. Assume that inquiring party 605A responds that he does want to leave a message. Server 140 may store the number, 555-555-4444 in phone number field 321 of database 320, as shown at row 3, of the table of FIG. 3B. Inquiring party 605A may provide an audio message that may be recorded and stored as an audio file in message field 324 of database 320, as shown at row 3, of the table in FIG. 3B. At this point, the call may end.

Assume later that, affected party 605B uses telephone 610B to connect to emergency contact platform 130 via network 120 for purposes of registering the number, 555-555-4444. Affected party 605B may call, for example, a toll-free telephone number to access emergency contact platform 130. Upon receiving the call from affected party 605A, server 140 may provide an introductory message and/or instructions for using the emergency contact service.

Server 140 may prompt user 605B to select between registering a phone number and inquiring about a phone number. Assume that affected party 605B indicates a desire to register a phone number. Server 140 may prompt affected party 605B to provide the phone number to be registered. Assume affected party 605B provides the number, 555-555-4444, for example, using a keypad on telephone 610B.

Server 140 may perform a lookup in database 150 to determine whether the number, 555-555-4444, has already been registered or is the subject of a previous inquiry. In this example, server 140 determines that an inquiry has been received for the number, 555-555-4444, and is stored in database 320, as shown in the third row of the table at FIG. 3B. Server 140 may inform affected party 605B that an inquiry has been made. Assume affected party 605B indicates a desire to receive the stored message. In this example, server 140 provides the stored message to inquiring party 605B. Inquiring party 605B may proceed with registering the number, 555-555-4444.

CONCLUSION

Systems and methods described herein enable communications between parties when it has become difficult or impossible to use the usual telephone line, by using an emergency contact platform. Communications may be facilitated by registration of the affected telephone number and processing an inquiry identifying the affected telephone number.

In this disclosure, there is shown and described preferred embodiments of the invention, but, as aforementioned, it is to be understood that the invention is capable of use in various other combinations and environments and is capable of changes or modifications within the scope of the inventive concept as expressed herein. For example, communication devices that may interact with the emergency contact platform via a data network (e.g., the Internet), may include computer devices without voice capabilities. In addition, the communication device may include a ham radio, a short-wave radio, or another type of two-way radio communication device. The date and time of any operation of the emergency contact platform may be recorded and provided upon request.

The emergency contact platform may notify a party of another party's activity with the emergency contact platform.

In the series of acts described with respect to FIGS. 4-6, the order of the acts may be varied in other implementations consistent with the present invention. Moreover, non-dependent acts may be performed in parallel.

No element, operation, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system comprising:
   an emergency contact platform including:
      a server to:
         receive an inquiry about a phone number associated with a phone that is unavailable due to an emergency event, the inquiry being received from an inquiring party,
         determine whether the phone number has already been registered,
         receive notification information from the inquiring party when the phone number is determined not to have already been registered,
         store the notification information,
         receive, subsequent to storing the notification information, registration information from a registering party, the registration information including the phone number,
         store the registration information, and
         provide the notification information to the registering party in response to receiving the registration information; and
      a database to:
         store the received notification information, and
         store the received registration information,
      where the server is further to:
         receive, subsequent to storing the registration information, an information request identifying the phone number,
         perform a lookup in the database based on the phone number, and
         provide a result of the lookup based on the received information request.

2. The system of claim 1, where the server is to receive the registration information via a toll-free call.

3. The system of claim 1, where the server is to receive the information request via a toll-free call.

4. The system of claim 1, where the registration information includes alternate contact information, and
   where the server is further to establish a communication link to the alternate contact information based on the result of the lookup and the received information request.

5. The system of claim 1, where the information request includes contact information, and
   where the database is further to store the contact information when the server receives the information request before the the server receives the registration information.

6. The system of claim 5, where the server is further to generate a notification based on the contact information when the server subsequently receives the registration information.

7. The system of claim 1, where the information request is received via a call placed to the phone number, and
   where the server receives the call based on at least one of an area code, an exchange, or a geographic location associated with the phone number.

8. The system of claim 1, where the registration information includes screening information,
   where the database is further to store the screening information, and
   where the server is further to screen the information request based on the stored screening information.

9. A communications platform comprising:
   means for receiving an inquiry request, from an inquirer, regarding a telephone number;
   means for determining, in response to receiving the inquiry request, whether the telephone number has been registered;
   means for receiving notification information from the inquirer when the telephone number has been determined not to have been registered;
   means for storing the notification information;
   means for receiving, subsequent to storing the notification information, registration information from a registrant, where the registration information includes the telephone number and alternate contact information associated with the registrant;
   means for associating the alternate contact information with the telephone number in a memory;
   means for providing the notification information to the registrant in response to associating the alternate contact information with the telephone number in the memory;
   means for receiving an inquiry for the alternate contact information from a second inquirer, where the inquiry identifies at least one of the registrant or the telephone number;
   means for retrieving the stored alternate contact information based on the inquiry;
   means for providing the retrieved alternate contact information to the second inquirer; and
   means for enabling communication between the registrant and the second inquirer using the retrieved alternate contact information.

10. The communication platform of claim 9, where the means for receiving registration information receives the registration information via atoll-free call.

11. The communication platform of claim 9, where the means for receiving an inquiry request receive the inquiry request via a toll-free call.

12. The communication platform of claim 9, further comprising:
   means for generating a notification based on the stored notification information when the means for receiving the registration information subsequently receives the registration information.

13. The communication platform of claim 9, where the registration information includes screening information, and
   where the communication platform further includes:
   means for screening the inquiry for the alternate contact information based on the stored screening information.

* * * * *